Oct. 10, 1967  C. E. MEGINNIS  3,345,872
SIGHT GLASS ASSEMBLY
Filed April 29, 1964  2 Sheets-Sheet 2
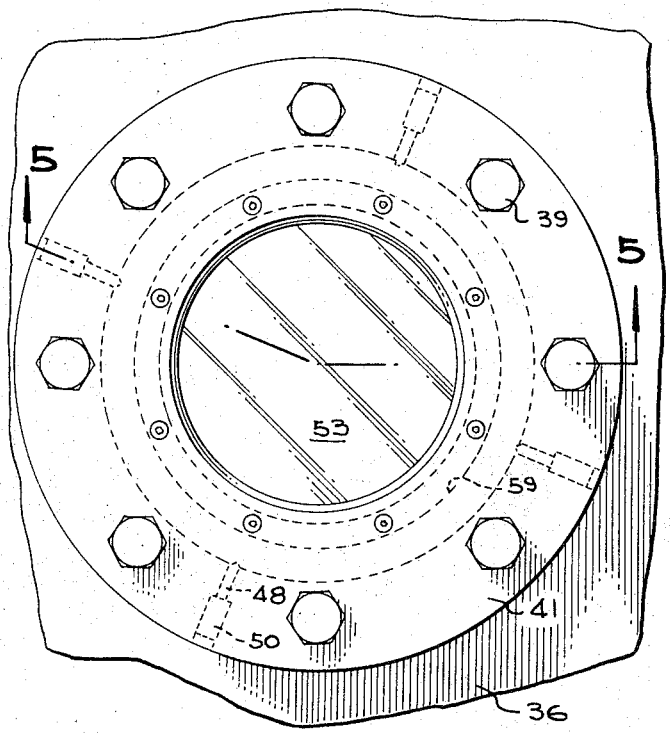
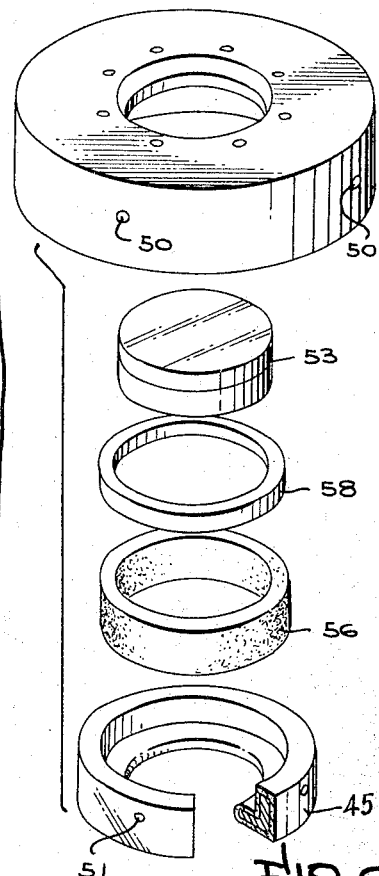
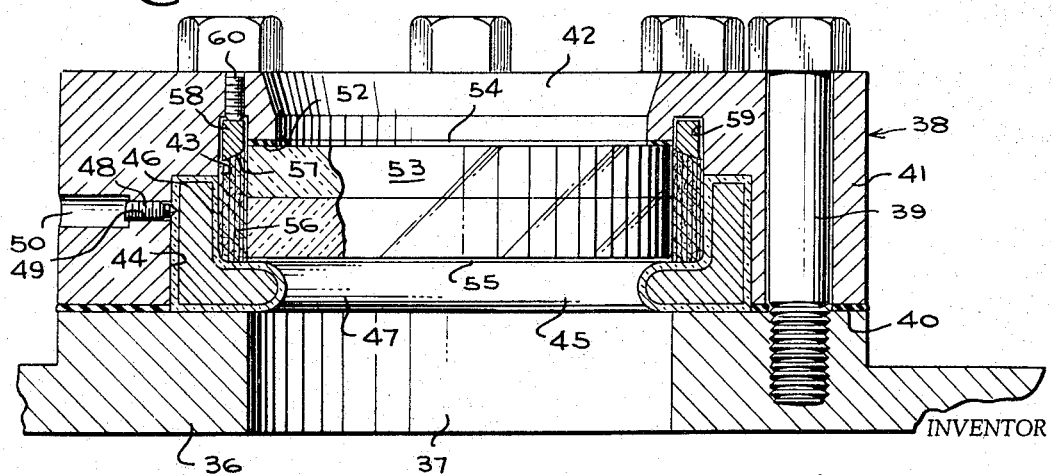
INVENTOR
CHARLES E. MEGINNIS
BY Mason, Fenwick & Lawrence
ATTORNEYS

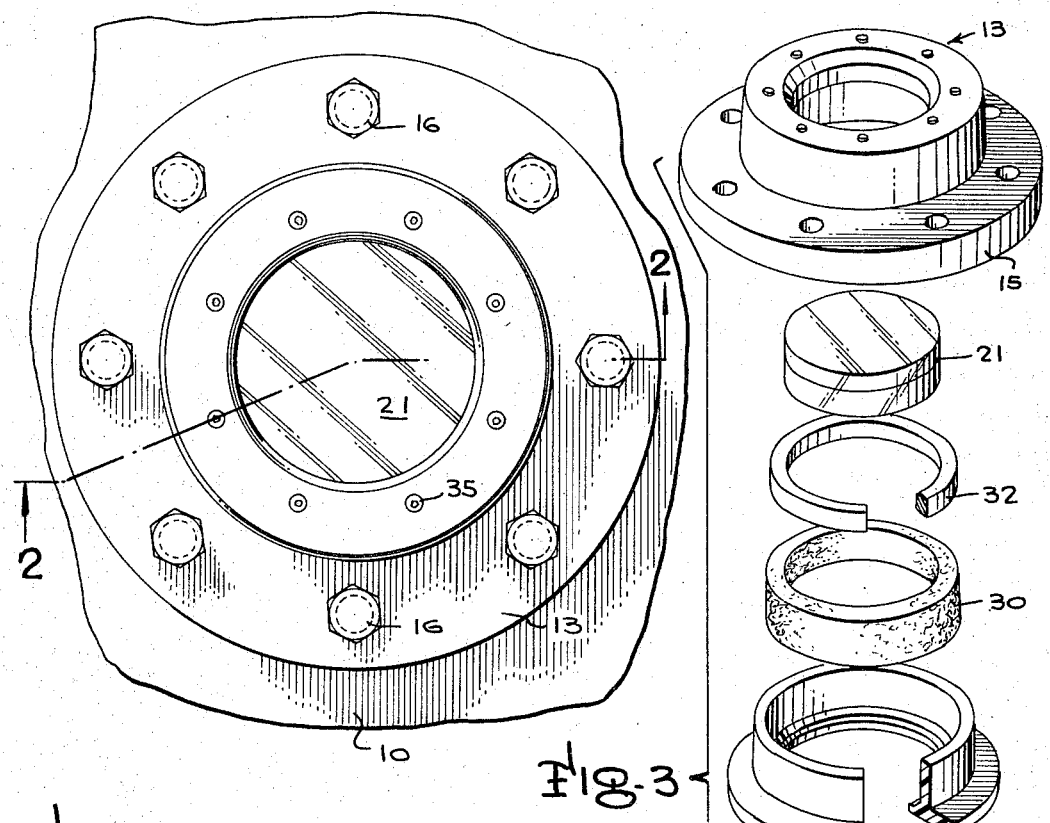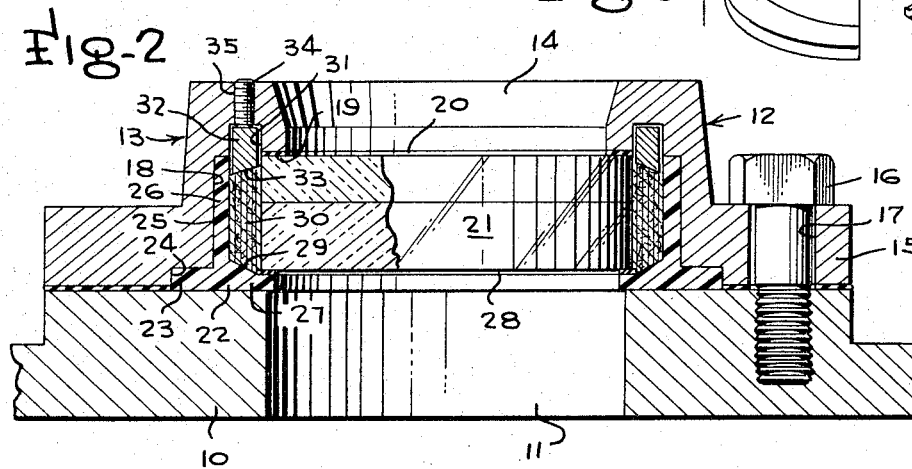

3,345,872
SIGHT GLASS ASSEMBLY
Charles E. Meginnis, 429½ Nancy St.,
Charleston, W. Va. 25311
Filed Apr. 29, 1964, Ser. No. 363,389
8 Claims. (Cl. 73—334)

This invention relates to a sight glass assembly and more particularly to a sight glass assembly suitable for containers containing corrosive fluids.

In the prior art, sight glass assemblies adapted for use with gas or liquid containers often are provided with a resilient packing member which is compressed to form a fluid tight seal between the sight glass and the housing structure for the sight glass which is secured to the fluid container. Usually, the packing member is exposed to the interior of the container so that it is subject to deterioration or corrosion caused by the fluid within the container. In addition, the housing structure also often is exposed to the interior of the container so that it also is subjected to the same deterioration or corrosion by the fluid in the container.

Accordingly, it is the principal object of this invention to provide an improved sight glass assembly.

Another object of this invention is to provide an improved sight glass assembly for a fluid container, wherein the sealing means between the sight glass and the housing structure for the sight glass is protected from the corrosive action of the fluid within the container.

A further object of this invention is to provide an improved sight glass assembly having the sight glass mounted within a metallic housing structure, wherein the sealing means provided between the sight glass and the housing structure, and the housing structure are protected from any corrosive action normally caused by fluid within the container.

A still further object of this invention is to provide an improved sight glass assembly for fluid containers containing corrosive gases or liquids, wherein noncorrosive resistant sealing means may be provided to form a seal between the sight glass and the housing structure for the sight glass.

Another object of the present invention is to provide an improved sight glass assembly for a fluid container, wherein there is provided a fluid tight seal between the sight glass and the housing structure for the sight glass for the life of the assembly.

A further object of the present invention is to provide an improved sight glass assembly for containers containing corrosive gases or liquids, which is simple in construction, easy to assemble and inexpensive to manufacture.

Other objects of the present invention will become more aparent to those persons skilled in the art, from the following description when taken in conjunction with the accompanying drawings, wherein:

FIGURE 1 is a top plan view of a first embodiment of the invention;

FIGURE 2 is a cross-sectional view taken along line 2—2 in FIGURE 1;

FIGURE 3 is an exploded view of the embodiment illustrated in FIGURES 1 and 2;

FIGURE 4 is a top plan view of a second embodiment of the invention;

FIGURE 5 is a cross-sectional view taken along line 5—5 in FIGURE 4; and

FIGURE 6 is an exploded view of the embodiment illustrated in FIGURES 4 and 5.

In accordance with the broad aspects of the present invention there is provided an improved sight glass assembly for a fluid container, generally comprising a housing structure having an opening therethrough, a sight glass mounted in the opening, sealing means disposed about the periphery of the sight glass, and an insert consisting of an inert material interposed at least between the sealing means or the housing structure and the opening communicating with the interior of the container and, preferably, between the sealing means and the housing structure, and the opening in the container.

Referring to FIGURES 1 through 3, there is illustrated a first embodiment of the invention. Specifically, there is illustrated a fluid container 10, having a circular opening 11 therein and a sight glass assembly 12 secured to the fluid container. The sight glass assembly includes a housing structure 13 having an opening 14 adapted to register with the opening 11 in the fluid container and a lower annular flange portion 15. The housing structure is secured to the fluid container 10 by means of a plurality of bolts 16 extending through suitable openings 17 circumferentially spaced in the annular flange portion 15, which are adapted to register with suitable threaded holes in the fluid container. The opening 14 in the housing structure is provided with an enlarged section 18, which provides an annular upper shoulder 19. Mounted on the shoulder 19 is a gasket 20 and a circular sight glass 21 having a diameter less than the diameter of the enlarged section 18. Disposed within the enlarged section 18 is an insert 22 having an outwardly extending annular flange portion 23 extending into an annular recess 24 at the lower end of the enlarged section 18, an upwardly extending annular portion 25 engaging the cylindrical surface 26 of the enlarged section and an inwardly extending annular flange portion 27 which provides a seat for an annular primary sealing gasket 28 interposed between the annular flange portion 27 of the insert 22 and the sight glass 21.

The juncture of the upwardly extending portion 25 and the inwardly extending flange portion 27 of the insert is beveled as at 29 for seating an annular packing ring 30 mounted between the upwardly extending annular portion 25 of the insert and the sight glass 21. The lower end of the packing ring 30 is beveled to correspond with the beveled seating surface 29 on the insert.

The shoulder portion 19 provided by the enlarged section 18 is formed with an annular recess 31, which is adapted to receive a compression ring 32. The ring 32 extends into the enlarged section 18 and has a beveled surface 33 engageable with a correspondingly beveled upper surface on the packing ring 30. The compression ring 32 is adapted to compress the packing member 30, causing it to distort radially relative to the axis of the opening 14, thereby forming a fluid tight seal between the insert 22 and the sight glass 21. It will be noted that the upwardly extending portion 25 of the insert shields the packing member from the housing structure 12, and the inwardly extending flange portion 27, on which the sight glass 26 is seated, shields the gasket 30 and the housing structure from the opening 11 in the fluid container. The top surface of the housing structure 12 is provided with a plurality of circumferentially spaced threaded openings 34 communicating with the annular recess 31 which receive set screws 35. The set screws 35 are adapted to engage the compression ring 32 to force it downwardly, thereby compressing the packing ring 30 and expanding it radially.

The insert 22 may consist of any inert or corrosive resistant material. The material should be suitable so as not to react with the housing structure which would normally be formed from a metallic material or any corrosive gases or liquids contained within the fluid container 10. It is preferred that the insert 22 be formed of a material such as Teflon. The insert also can be constructed from a noncorrosive metal such as stainless steel and titanium.

FIGURES 4 through 6 illustrate a second embodiment of the invention which is similar to the above mentioned embodiment. Specifically, there is shown a fluid container 36 having a circular opening 37 and a sight glass assembly 38 secured to the fluid container 36 by means of suitable bolts 39. Interposed between the fluid container and the sight glass assembly is a suitable gasket 40. The sight glass assembly 38 generally comprises a housing structure 41 having a circular opening 42 therein adapted to register with the opening 37 of the fluid container. The opening 42 is formed with an upper enlarged section 43 and a lower enlarged section 44. Disposed within the lower enlarged section 44 is a glass lined insert 45 having an upwardly extending annular portion 46 and an inwardly extending annular flange portion 47. The lower surface of the insert 45 is adapted to engage the upper surface of the fluid container 36 about the periphery of the opening 37. The insert 45 also is secured to the housing structure within the enlarged section 44 by means of a plurality of circumferentially spaced set screws 48 extending through radially disposed threaded openings 49 communicating with access openings 50 provided in the cylindrical outer surface of the housing structure, and the enlarged section 44 of the opening 42. The upwardly extending portion 46 of the insert is provided with a plurality of depressions 51 registerable with the threaded opening 49 for receiving the nose portions of the set screws 48.

Mounted between the inwardly extending annular flange portion 47 of the insert and the shoulder 52 provided by the upper enlarged section 43 is a sight glass 53. The sight glass is provided with a gasket 54 disposed between the housing structure and the sight glass and a primary sealing gasket 55 interposed between the sight glass and the insert.

A packing ring 56 is disposed between the upwardly extending portion 46 of the insert and the sight glass, to provide a seal between the insert and the sight glass. The lower end of the packing ring 56 is seated on the upper surface of the flange portion 47 of the insert, and the upper surface thereof is beveled, which is engaged by the lower beveled surface 57 of a compression ring 58. The compression ring 58 extends up into an annular recess 59 formed in the shoulder 52 and is engaged by a plurality of set screws 60 provided in suitable threaded openings in the top surface of the housing structure. Similar to the operation of the first mentioned embodiment, the set screws 60 may be tightened to cause the compression ring 58 to compress the packing ring 56, causing it to distort radially, thereby forming a fluid tight seal between the insert and the sight glass. The insert 45 also is constructed of an inert or corrosive resistant material and preferably consists of a metallic member with a glass lining. It will be seen that the upwardly extending portion 46 substantially shields the packing ring 56 from the housing structure, and the inwardly extending annular flange portion 47, upon which the sight glass 53 is seated, shields the packing ring and the housing structure for the sight glass from the opening 37 in the fluid container. The packing ring can be compressed by means of the detached ring and set screw arrangement as mentioned in connection with the above described embodiments, or it can be compresed by an engaging portion of the housing structure when the housing structure is secured to the fluid container.

Since the packing member in either of the above described embodiments is entirely shielded from any of the corrosive gases or fluids within the fluid container by the inert insert and the primary sealing gasket, it may be constructed of any suitable material. It is not necessary that a corrosive resistant packing member be selected for use in the assembly. This would permit a greater selection of materials insofar as the packing ring is concerned. Also, this would considerably reduce the cost of the packing ring, in that less expensive materials can be used which are serviceable for a longer period of time.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. A sight glass assembly comprising a housing structure having a circular opening therethrough, said opening having an enlarged section providing an annular shoulder, a circular sight glass mounted on said annular shoulder, annular sealing means consisting of a resilient material disposed about the periphery of said sight glass, an annular insert consisting of a corrosive resistant material interposed between said sealing means and said housing structure including an inwardly extending annular flange portion interposed between said sealing means and said housing structure, and said opening and means engageable with said sealing means for compressing said sealing means against said sight glass and said insert.

2. A sight glass assembly comprising a housing structure having a circular opening therein, said opening having an enlarged section providing a shoulder portion on said housing structure, a circular sight glass disposed within said opening and seated on said annular shoulder, annular sealing means disposed about the periphery of said sight glass and an insert consisting of a corrosive resistant material interposed between said sealing means and said housing structure having an annular flange portion extending inwardly relative to said opening for seating said sight glass and said sealing means, disposed between said housing structure and said opening.

3. A sight glass assembly comprising a housing structure having a circular opening therein, said opening having an enlarged section providing an annular shoulder on said housing structure, a sight glass seated on said annular shoulder, an annular sealing means consisting of a flexible material disposed about the periphery of said sight glass, an annular insert consisting of a corrosive resistant material interposed between said sealing means and said housing structure having an annular flange portion thereon extending inwardly relative to said opening for seating said sealing means and said sight glass, said annular flange portion being disposed between said housing structure and said opening, and means engageable with said sealing means for compressing said sealing means against said insert and said sight glass.

4. A sight glass assembly comprising a housing structure having a circular opening therethrough, said opening having an enlarged section providing an annular shoulder, a circular sight glass having a diameter less than the diameter of said enlarged opening mounted on said annular shoulder, annular sealing means consisting of a resilient material disposed about the periphery of said sight glass, an annular insert consisting of a corrosive resistant material interposed between said sealing means and said housing structure within said enlarged section including an inwardly extending annular flange portion interposed between said sealing means and said housing structure, and said opening for seating said sealing means and said sight glass, a compression ring disposed within said enlarged section on said sealing means and said housing structure having a plurality of circumferentially spaced threaded openings communicating with said enlarged section for receiving set screws engageable with said compression ring for compressing said sealing means against the inwardly extending flange portion of said insert to expand said sealing means radially relative to the axis of said opening thereby forming a seal between the insert and the sight glass.

5. A sight glass assembly according to claim 4, wherein the insert consists of a glass lined member and a gasket is provided between the sight glass and the inwardly extending flange portion of the insert.

6. A sight glass assembly comprising a housing structure having a circular opening therethrough, said opening having an enlarged section providing an annular shoulder, a circular sight glass having a diameter less than the diameter of said enlarged section mounted on said annular shoulder, a packing ring consisting of a resilient material disposed about the periphery of said sight glass within said enlarged section, an annular insert consisting of a corrosive resistant material interposed between said sealing means and said housing structure within said enlarged section including an inwardly extending annular flange portion interposed between said sealing means and said opening, said annular shoulder provided by said enlarged section having an annular recess, a compression ring disposed within said recess and extending into said enlarged section engageable with said packing member, and said housing structure having a plurality of threaded openings communicating with said annular recess for receiving a plurality of set screws engageable with said compression ring.

7. A sight glass assembly according to claim 6, wherein the insert consists of Teflon and there is provided a gasket between the sight glass and the inwardly extending flange portion of the insert.

8. A sight glass assembly according to claim 6, wherein the packing member is provided with beveled top and bottom surfaces and the inwardly extending flange portion of the insert and compression ring are provided with correspondingly beveled engaging surfaces.

References Cited
UNITED STATES PATENTS

| | | | |
|---|---|---|---|
| 2,385,924 | 10/1945 | Knudsen | 220—82 XR |
| 2,461,989 | 2/1949 | LeRoy | 220—82 |
| 2,714,868 | 8/1955 | Franck | 116—117 |
| 3,148,543 | 9/1964 | LeRoy | 73—331 |
| 3,208,775 | 9/1965 | Stap et al. | 220—46 XR |

LOUIS R. PRINCE, *Primary Examiner.*

D. M. YASICH, *Assistant Examiner.*